(12) United States Patent
Nightingale

(10) Patent No.: US 6,524,089 B1
(45) Date of Patent: Feb. 25, 2003

(54) MULTILAYER INJECTION NOZZLE ASSEMBLY

(75) Inventor: Richard Nightingale, Woodstock, IL (US)

(73) Assignee: Pechiney Emballage Flexible Europe (FR)

(*) Notice: Subject to any disclaimer, the term of this patent is extended or adjusted under 35 U.S.C. 154(b) by 0 days.

(21) Appl. No.: 09/932,699

(22) Filed: Aug. 17, 2001

Related U.S. Application Data

(63) Continuation of application No. 09/086,994, filed on May 29, 1998, now abandoned.

(51) Int. Cl.⁷ .................................................. B29C 45/16
(52) U.S. Cl. ...................................... 425/130; 264/513
(58) Field of Search ................................ 425/130, 570; 264/513

(56) References Cited

U.S. PATENT DOCUMENTS

| | | | | |
|---|---|---|---|---|
| 3,902,665 A | * | 9/1975 | Hendry .................... | 239/583 |
| 3,976,226 A | * | 8/1976 | Monnet ..................... | 425/130 |
| 4,117,955 A | * | 10/1978 | Sokolow ................... | 425/130 |
| 4,376,625 A | * | 3/1983 | Eckardt .................... | 425/564 |
| 4,470,936 A | * | 9/1984 | Potter ...................... | 425/573 |
| 4,474,333 A | * | 10/1984 | Muller ..................... | 239/462 |
| 4,582,224 A | * | 4/1986 | Proksa et al. ............. | 425/562 |
| 4,717,324 A | * | 1/1988 | Schad et al. .............. | 425/130 |
| 4,775,308 A | * | 10/1988 | Schad et al. .............. | 425/130 |
| 4,808,101 A | * | 2/1989 | Schad et al. .............. | 425/130 |
| 4,863,665 A | * | 9/1989 | Schad et al. .............. | 264/328.14 |
| 4,931,234 A | * | 6/1990 | Schad et al. .............. | 425/130 |
| 5,030,076 A | * | 7/1991 | Ebenhofer et al. ........ | 425/130 |
| 5,094,603 A | * | 3/1992 | Gellert ..................... | 425/130 |
| 5,131,830 A | * | 7/1992 | Orimoto et al. ........... | 425/130 |
| 5,143,733 A | * | 9/1992 | Von Buren et al. ....... | 425/130 |
| 5,200,207 A | * | 4/1993 | Akselrud et al. .......... | 425/130 |

* cited by examiner

*Primary Examiner*—Tim Heitbrink
(74) *Attorney, Agent, or Firm*—McDermott, Will & Emery

(57) ABSTRACT

A multilayer injection nozzle assembly, for use with an injection molding machine, to form a multilayer injection molded article comprising an inner nozzle, a middle nozzle and an outer nozzle. The inner nozzle has a first hole which communicates with a first channel in the inner nozzle and for receiving a flow of a first material from the injection molding machine. The inner nozzle also has a second hole which communicates with a second channel in the inner nozzle for receiving a flow of a second material from the injection molding machine. The first channel communicates with an inner and an outer channel in the inner nozzle, whereby the first material flows from the first channel into both the inner channel and the outer channel. The first material that flows into the inner channel will flow out of the nozzle assembly to form a first layer of the injection molded article and the material that flows into the outer channel will flow out of the nozzle assembly to form a second layer of the injection molded article.

7 Claims, 8 Drawing Sheets

MULTILAYER INJECTION NOZZLE ASSEMBLY

This is a continuation of application Ser. No. 09/086,994 filed May 29, 1998 now abandoned.

BACKGROUND OF THE INVENTION

1. Field of the Invention

This invention relates generally to a nozzle assembly used for injection molding multilayer or multimaterial articles. More particularly, the invention relates to a nozzle assembly having an inner, middle and outer nozzle. The inner nozzle acts as a manifold for one of the materials whereby a stream of material that enters into the nozzle is split within the inner nozzle into at least two streams of material that form different layers of the injection molded article.

2. Background Art

Multilayer injection molded articles are formed by injecting layers of materials into a mold from a multilayer or multimaterial nozzle assembly. The various materials exit the nozzle assembly and flow into the mold to form separate layers within the mold. One common injection molded multilayer article is a three layer preform that is used to blow mold plastic bottles or containers. The preform can have an inner and outer layer made of the same material, such as polyethylene terephthalate ("PET"), and have a middle layer of a barrier material, such as ethylene vinyl alcohol copolymer ("EVOH").

Previous multilayer nozzle assemblies used to make three layer articles have been made with interfitting nozzles made of beryllium copper or steel. The layers of the various materials are kept separate in the nozzles and come together as layers as they exit the nozzle assembly. When the inner and outer layers of the molded article are formed of the same material, the layers are created by splitting a stream of the material in a channel defined between two sections of the nozzle assembly. The two sections of the nozzle assembly that define the split channels are a base or manifold section and an inner nozzle. One problem with these previous nozzle assemblies is that the area where the two sections meet creates leak points. Also, the prior nozzle assemblies require at least four separate pieces, a base, an inner nozzle, a middle nozzle and an outer nozzle. Further, these nozzle assemblies may result in poor seal integrity due to the design of component interfaces and surface flaws caused by cleaning and handling especially between the base and inner nozzle.

SUMMARY OF THE INVENTION

The multilayer injection nozzle assemblies of the invention are used to injection mold multilayer articles and comprise an inner, a middle and an outer nozzle. The inner nozzle functions both as a nozzle and as a manifold to split a stream of material into two or more separate streams of material that will form different layers of the injection molded article. The nozzle assemblies of the present invention have reduced leakage and improved performance.

It is one of the principal objectives of the present invention to provide multilayer injection nozzle assemblies that have reduced leakage.

It is another object of the invention to provide multilayer injection nozzle assemblies that can be cleaned easily.

It is still another object of the invention to provide multilayer injection nozzle assemblies that have longer life.

It is a further object of the invention to provide multilayer injection nozzle assemblies that are easy to assemble.

It is still another object of the invention to provide multilayer injection nozzle assemblies that have a reduced number of pieces.

It is further an object of the invention to provide nozzle assemblies containing flow paths that provide equalized pressure to achieve even spill-over around the nozzles.

DETAILED DESCRIPTION OF THE DRAWINGS

Figure 1:
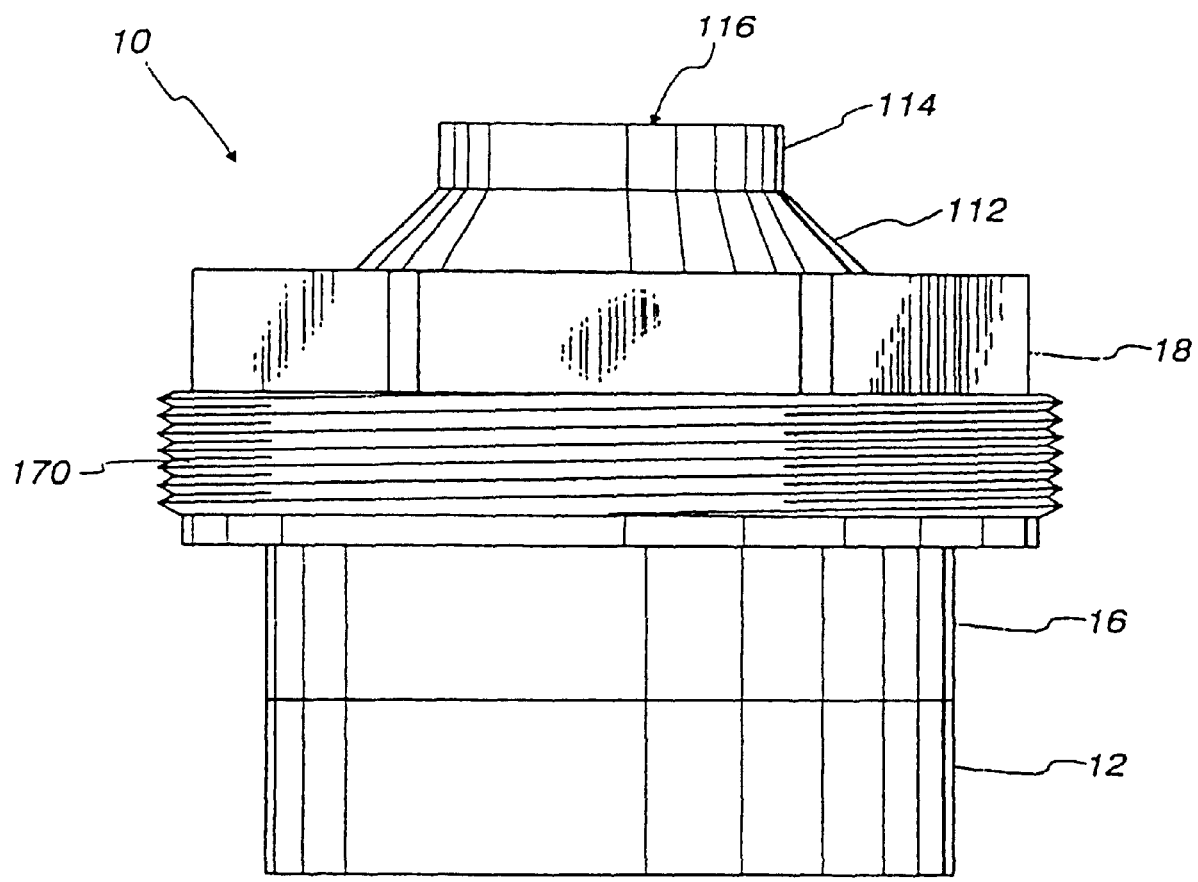
FIG. 1 is a side view of an assembled nozzle assembly according to the present invention.
Figure 2:
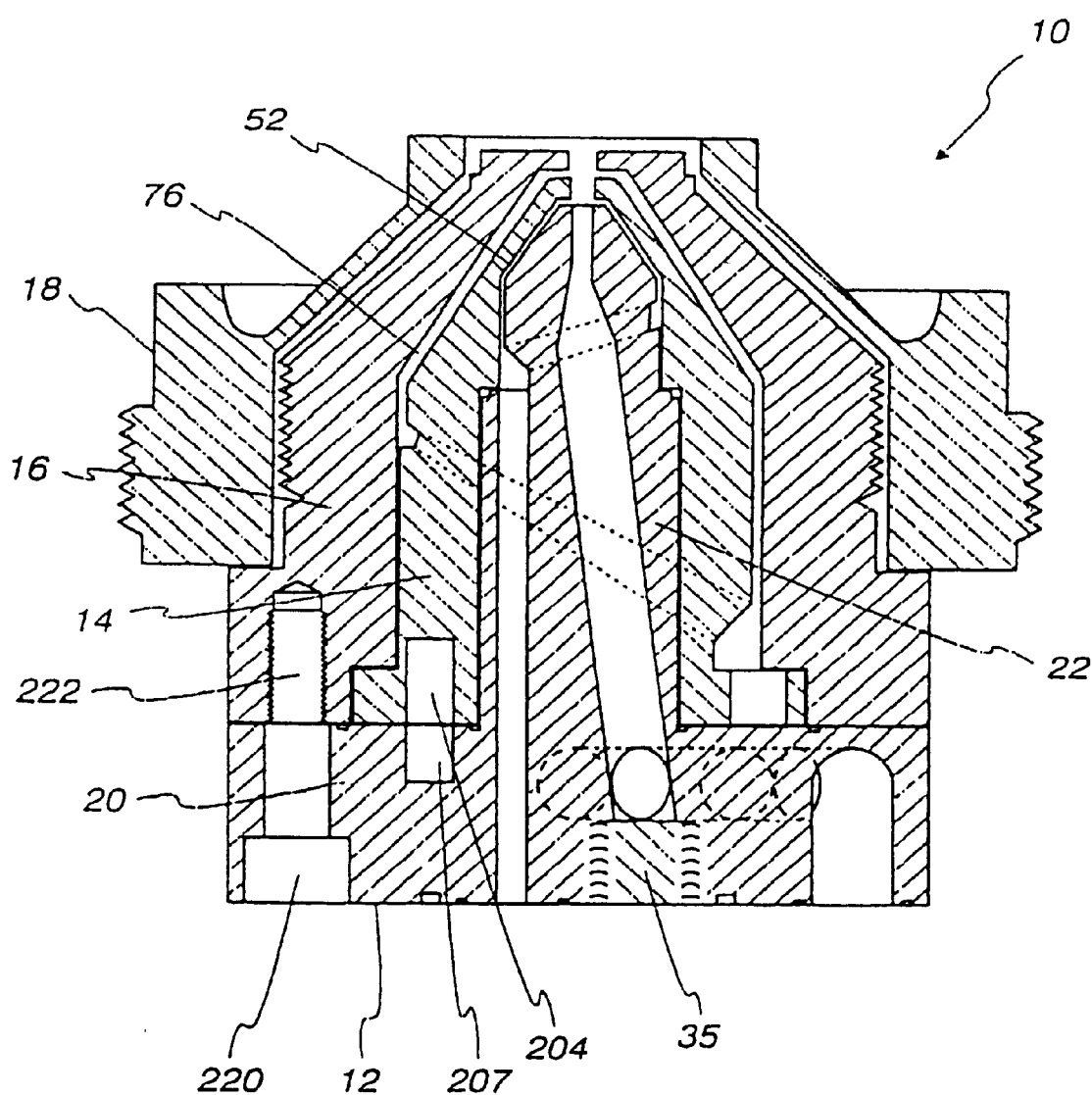
FIG. 2 is a cross sectional view of the nozzle assembly shown in FIG. 1.
Figure 3:
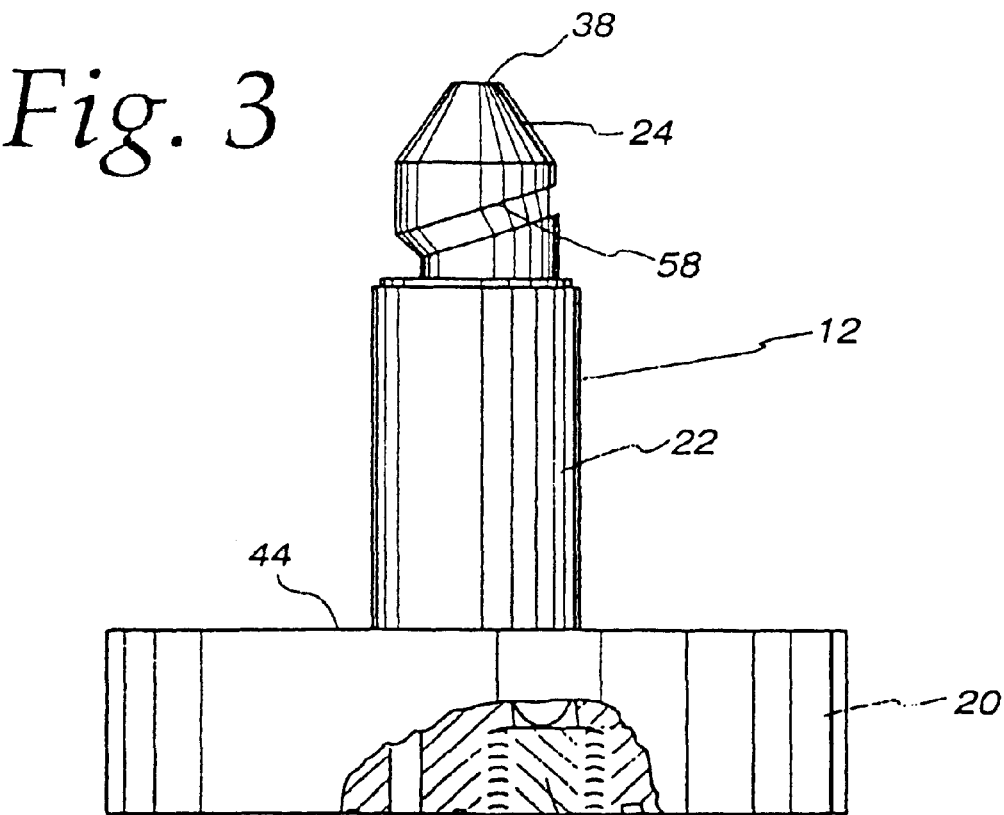
FIG. 3 is a side view of an inner nozzle of nozzle assembly shown in FIG. 1.
Figure 4:
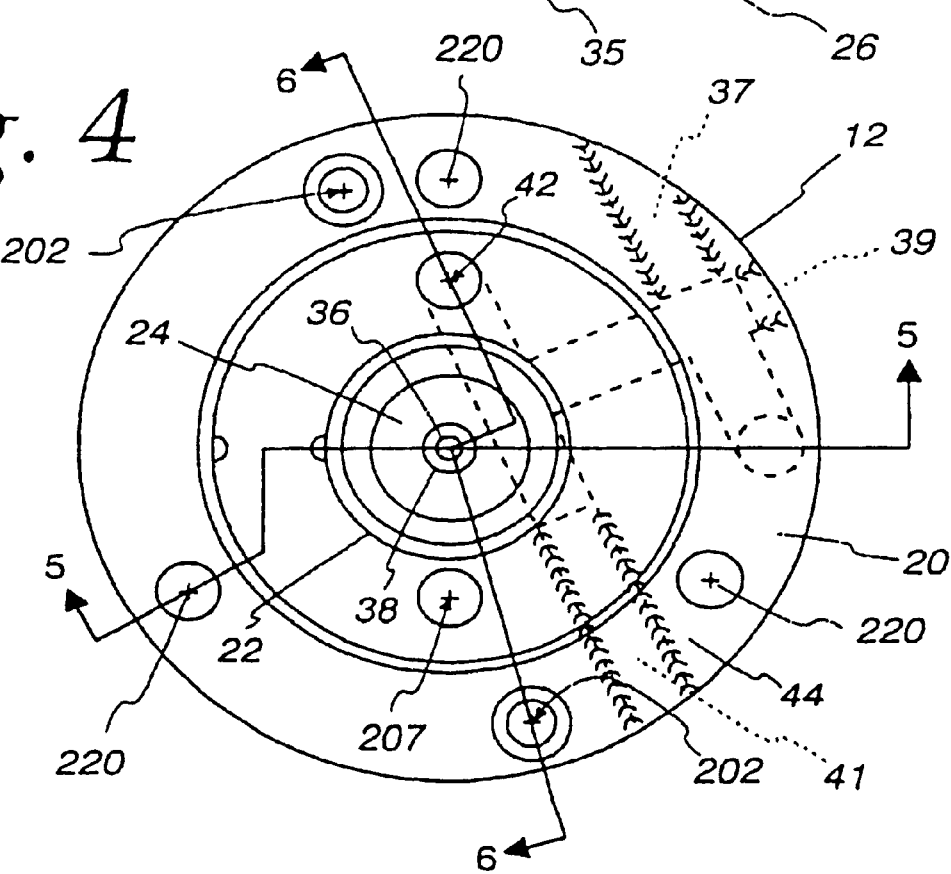
FIG. 4 is a top view of the inner nozzle shown in FIG. 1
Figure 5:
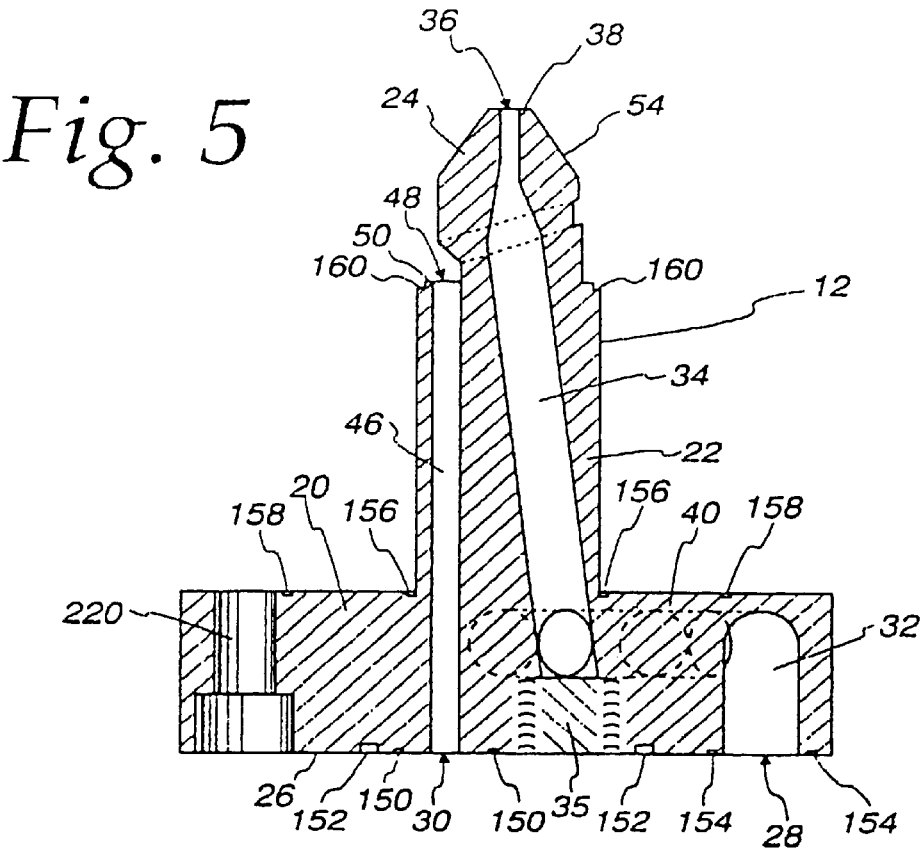
FIG. 5 is a cross sectional view of the inner nozzle of FIG. 4 taken along the line 5—5.
Figure 6:
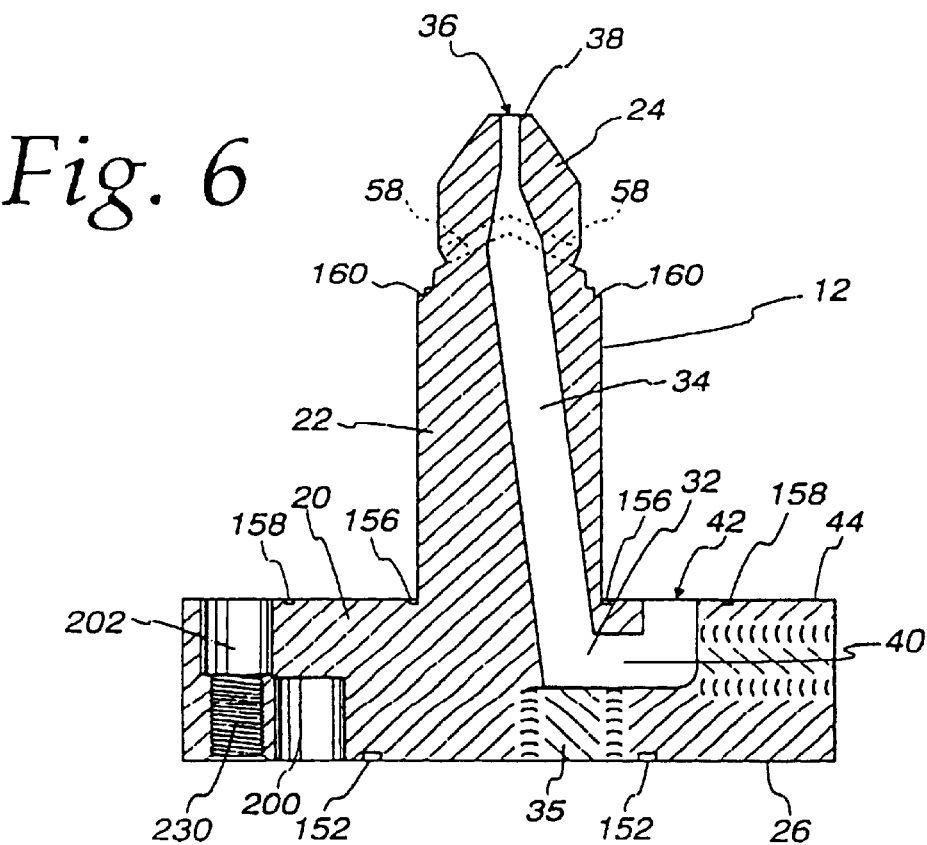
FIG. 6 is a cross sectional view of the inner nozzle of FIG. 4 taken along the line 6—6.

Referring now to FIGS. 1 and 2, there is shown a nozzle assembly (10) according to the present invention. The nozzle assembly (10) includes an inner nozzle (12), a middle nozzle (14) and an outer nozzle (16). A lock nut (18) is also provided to secure the assembled nozzle assembly (10) to an injection molding machine nozzle manifold (not shown).

Referring now to FIGS. 3–6, the inner nozzle (12) has a base portion (20), an elongate cylindrical portion (22) and a tapered top portion (24). The bottom (26) of the inner nozzle (12) has a first hole or inlet (28) for receiving a stream of a first material, such as PET, from the injection molding machine nozzle manifold. As will be described below, the inner nozzle (12) acts both as a nozzle and as a separate manifold for the first material because the stream of the first material is split in the inner nozzle (12) to form two streams of material that will form the inner and outer layers of the injection molded article. Note that the channel (32) may be split into more than two channels if needed to improve material flow through the nozzle.

A flow path for the first material is created in an upwardly extending channel (32) formed in the base portion (20) of the inner nozzle (12). The channel (32) splits into an inner channel (34) and an outer channel (40). The material that flows into the inner channel (34) will form an inner layer of the molded article. The material that flows into the outer channel (40) will form an outer layer of the molded article.

Channels (32), (34) and (40) are formed in the base portion (20) by drilling out the channels. After drilling out the channels, the base portion (20) must be welded to the outer perimeter of the base portion (20) to encapsulate the channels (42), (34), and (40). As shown, the base portion has four welded sections (35), (37), (39) and (41).

The inner channel (34) extends generally upwardly through the elongate cylindrical portion (22) of the inner nozzle (12) and ends at an orifice (36) in the top (38) of the inner nozzle (12). The outer channel (40) extends through the base portion (20) of the inner nozzle (12) and ends at an orifice (42) in a top surface (44) of the base portion (20) of the inner nozzle (12).

Two symmetrical channels (58) are cut into opposite sides of the top end of the inner nozzle (12). The symmetrical channels (58) are lowest and widest near the orifice (48) and highest and narrowest on the side opposite the orifice (48). As will be described below, the symmetrical channels (58) facilitate the flow of material into a distribution channel (52) (FIG. 2) and ensure that material flows evenly around the perimeter of an outer surface (54) of the inner nozzle (12).

The bottom (26) of the inner nozzle (12) also has a second hole or inlet (30) for receiving a stream of a second material from the injection molding machine nozzle manifold, such as EVOH, which will form the middle layer of the molded article. A flow path for the second material is created. in an upwardly extending channel (46). The channel (46) extends generally upwardly through the elongate cylindrical portion (22) of the inner nozzle and ends at an orifice (48) in a top surface (50) of the elongate cylindrical portion (22).

Figure 7:
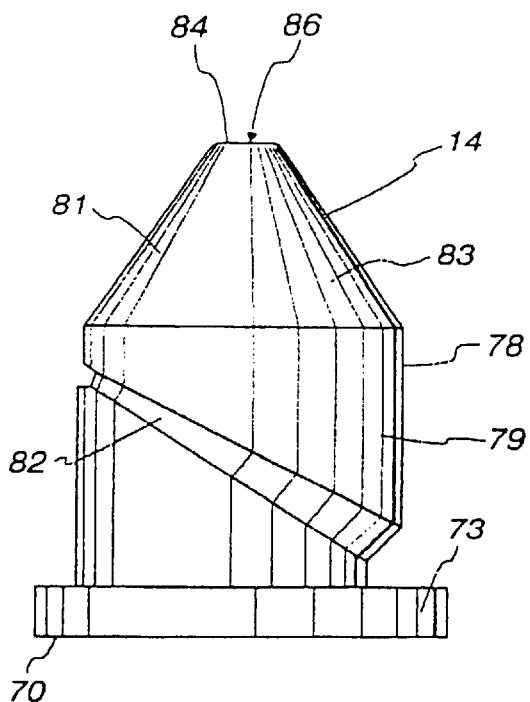
FIG. 7 is a side view of a middle nozzle of the nozzle assembly shown in FIG. 1.
Figure 8:
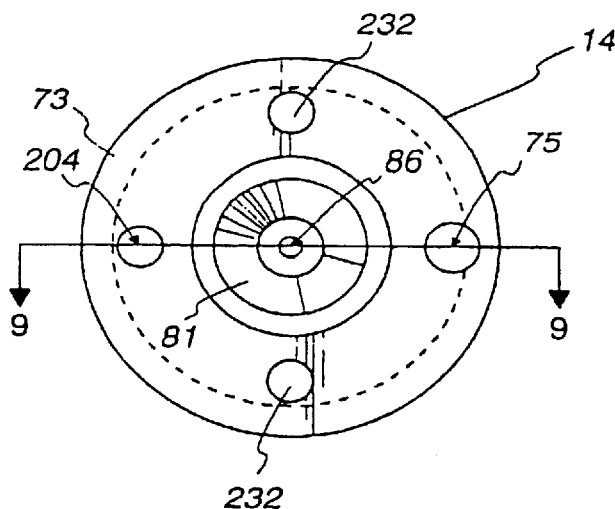
FIG. 8 is a bottom view of the middle nozzle shown in FIG. 7.
Figure 9:
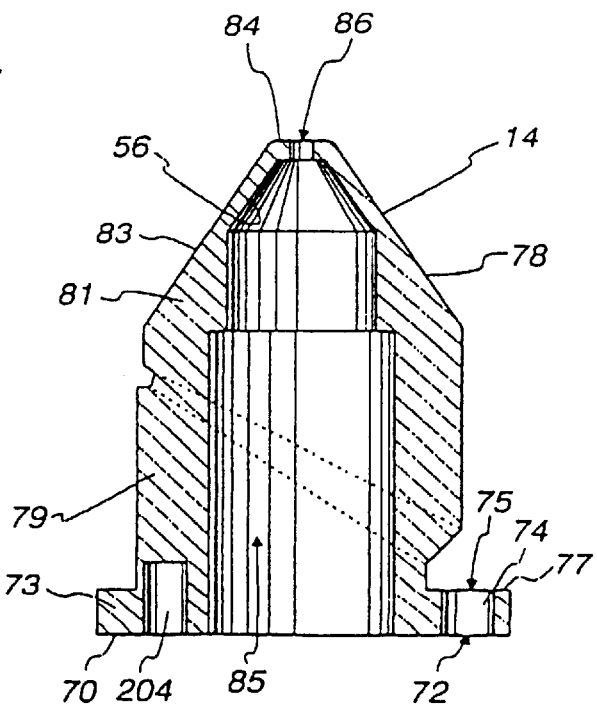
FIG. 9 is a cross sectional view of the middle nozzle of FIG. 8 taken along the line 9—9.

Referring now to FIGS. 7–9, the middle nozzle (14) has a base portion (73), a cylindrical portion (79) and a conical portion (81). A bottom surface (70) of the middle nozzle (14) has an inlet orifice (72) which, as will be described below, will receive the outer stream of the first material from the inner nozzle (12). When the inlet orifice (72) is aligned with the orifice (42) of the inner nozzle (12). The orifice (72) leads to a channel (74) which ends at an outlet orifice (75) on a top surface (77) of a base portion of the middle nozzle (14).

The middle nozzle (14) has a cavity (85) that is sized to receive the inner nozzle (12). When the inner nozzle (12) is properly placed within the middle nozzle (14), the distribution channel (52) is defined between an outer surface (54) on the tapered portion (24) of the inner nozzle (12) and an inner surface (56) of the middle nozzle (14).

Two symmetrical channels (82) are cut into opposite sides of the cylindrical portion of the middle nozzle (14). The symmetrical channels (82) are lowest and widest near the orifice (75) and highest and narrowest on the side opposite the orifice (75). As will be described below, the symmetrical channels (82) help the flow of material into a distribution channel (76) (FIG. 2) and ensure that material flows evenly around the perimeter of an outer surface (83) of the middle nozzle (12).

The conical portion (81) of the middle nozzle (14) has a top surface (84) with an orifice (86). When the inner nozzle (12) is properly placed within the middle nozzle (14), the orifice (86) is aligned with the orifice (36) of the inner nozzle.

Figure 10:
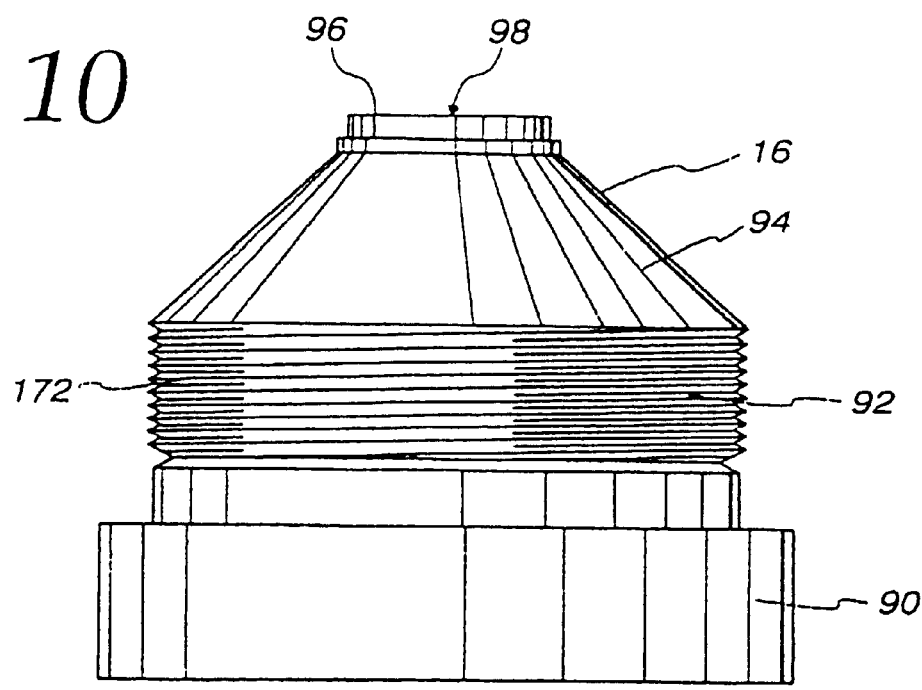
FIG. 10 is a side view of the outer nozzle of the nozzle assembly shown in FIG. 1.
Figure 11:
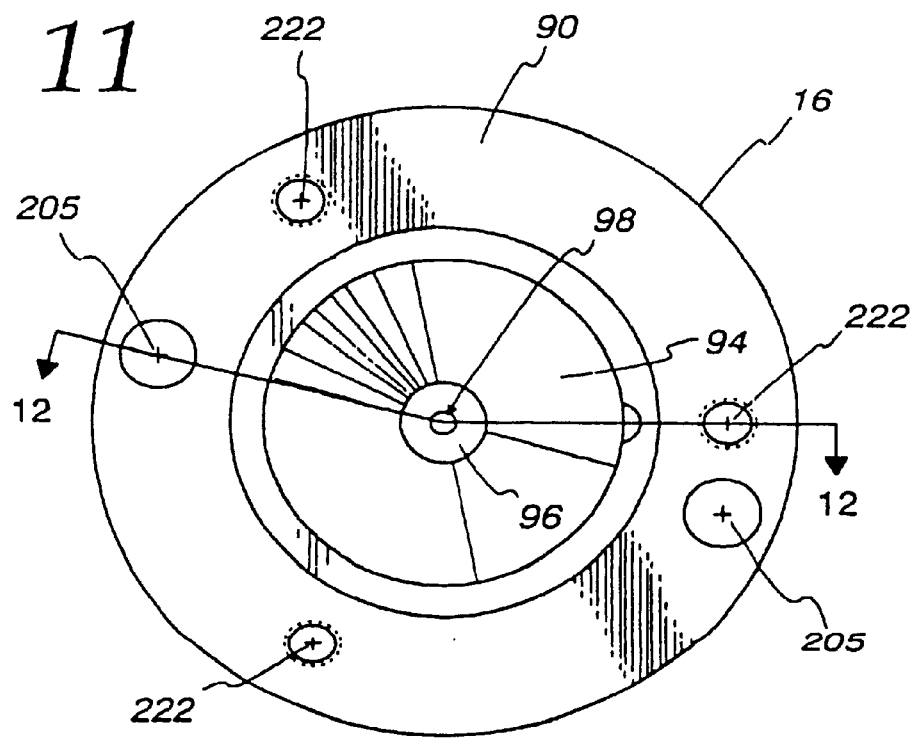
FIG. 11 is a bottom view of the outer nozzle shown in FIG. 10.
Figure 12:
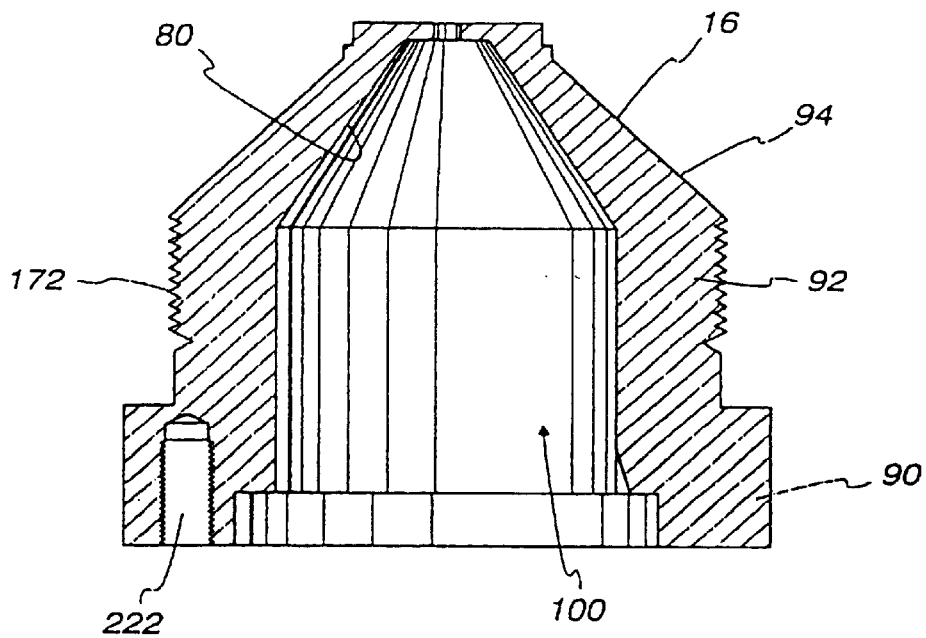
FIG. 12 is a cross sectional view of the outer nozzle of FIG. 11 taken along the line 12—12.
Figure 13:
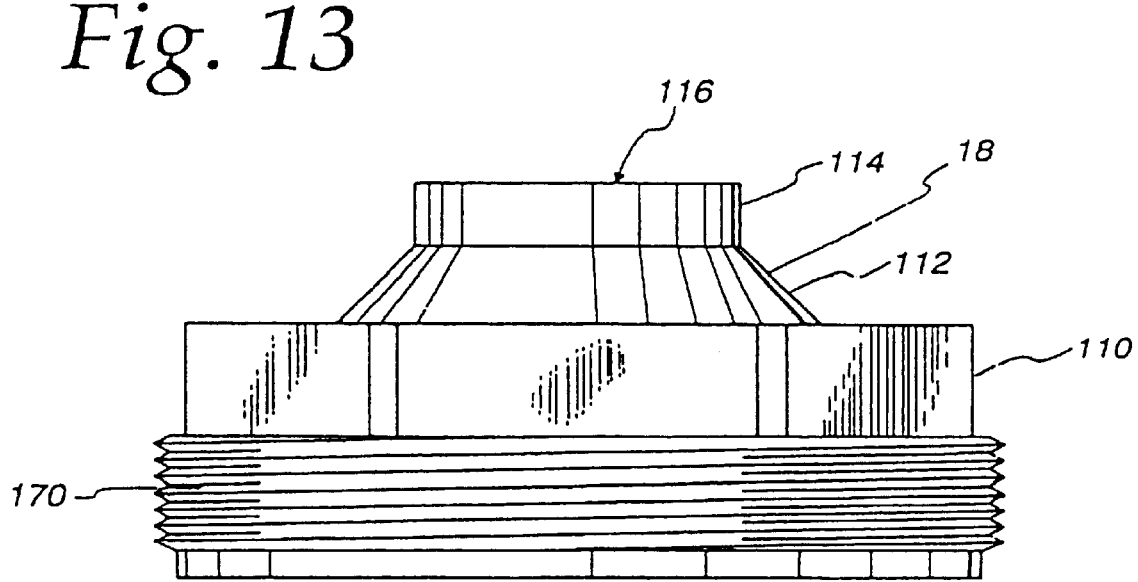
FIG. 13 is a side view of the lock nut of the nozzle assembly shown in FIG. 1
Figure 14:
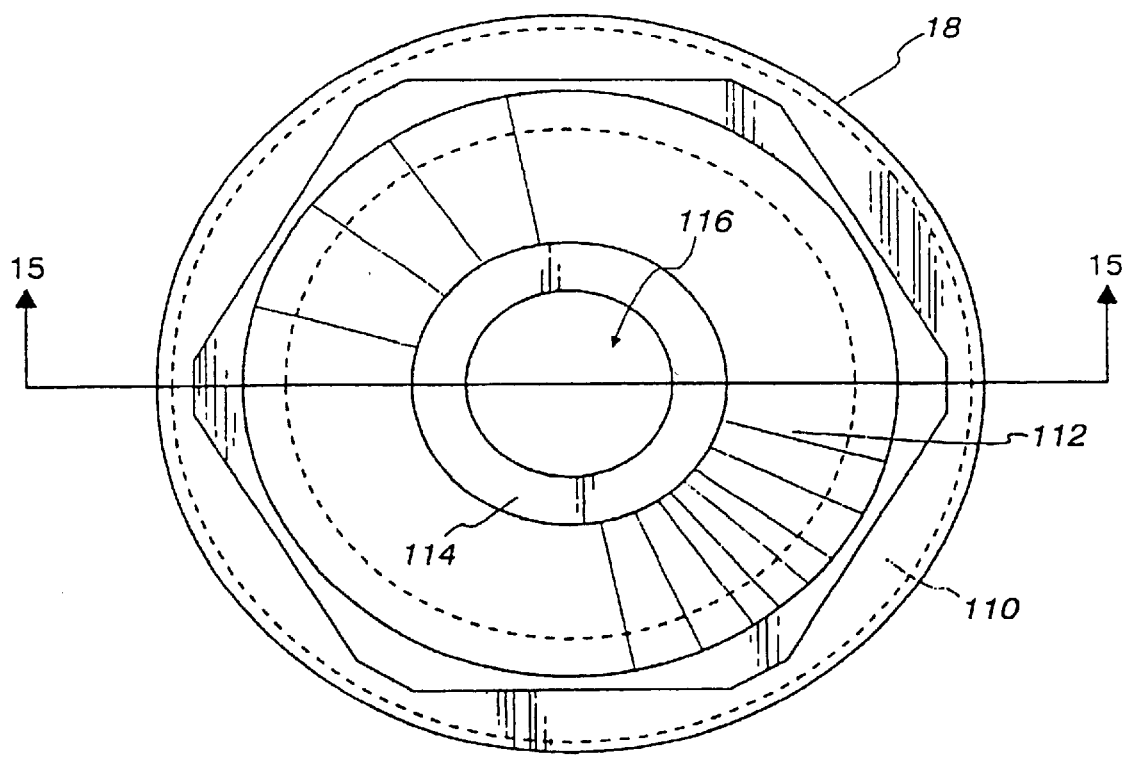
FIG. 14 is a top view of the lock nut shown in FIG. 13.
Figure 15:
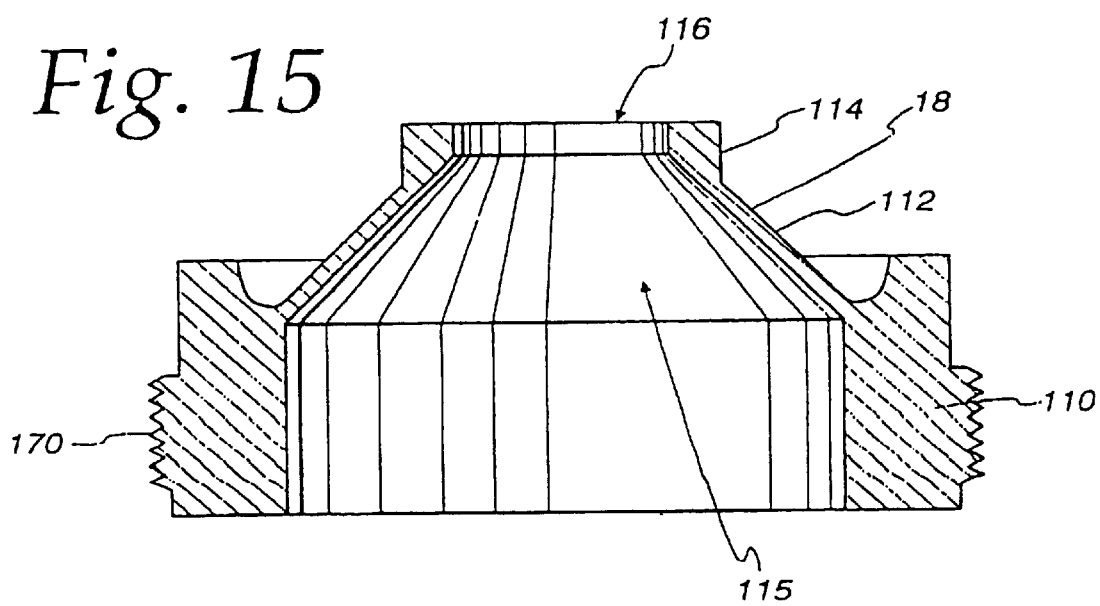
FIG. 15 is a cross sectional view of the lock nut of FIG. 14 taken along the line 15—15.

Referring now to FIGS. 10–12 the outer nozzle (16) has a base portion (90), a cylindrical portion (92) and a conical portion (94). A top surface (96) of the outer nozzle (16) has an orifice (98). When assembled, the orifice (98) is aligned with the orifice (86) in the middle nozzle (14) and the orifice (36) of the inner nozzle (12).

The outer nozzle (16) has a cavity (100) that is sized to receive the middle nozzle (14). When the middle nozzle (14) is properly placed within the outer nozzle (16), the distribution channel (76) is defined between the outer surface (83) on the tapered portion (24) of the middle nozzle (14) and an inner surface (80) of the outer nozzle (16).

The lock nut (18) has a lower hexagonal portion (110), a conical portion (112) and an upper cylindrical portion (114). A cavity (115) is defined within the lock nut (18) and is sized to receive the outer nozzle (16). The upper cylindrical portion (114) has an orifice (116).

The flow of the first and second materials through the nozzle assembly (10) to form a three layer article is described below.

A first material, such as PET, is fed from the injection molding machine nozzle manifold (not shown) to the inlet (28) in the inner nozzle (12). The material flows into the channel (32) and is split into the inner channel (34) and the outer channel (40).

Following the flow of the material that flows into the inner channel (34) and forms the inner layer of the article, the material flows out the orifice (36) in the top of the inner nozzle (12) and continues through the orifice (86) in the middle nozzle (14) and finally out the orifice (98) in the outer nozzle (16) and into the mold.

The material that flows into the outer channel (40) and forms the outer layer of the article, flows out of the orifice (42) and into the into the middle nozzle via orifice (72) and into the channel (74). The material then flows out of the channel (74) through orifice (75) and into the distribution channel (76). Some of the material flows directly around the outer surface (78) of the middle nozzle (14). The rest of the material flows into the channels (82). The material that flows into the channels (82) flows up the channels (82) and eventually over the channels (82) into the distribution channel (76). All of the material from the distribution channel (76) exits orifice (98) of the outer nozzle (16).

A second material, such as EVOH, which will form the middle layer of material, is fed from the injection molding machine nozzle manifold (not shown) to the inlet (30) in the inner nozzle (12). The material flows up the channel (46) and exits out orifice (48) into the distribution channel (52). Some of the material flows directly around the outer surface (54) of the inner nozzle (12). The rest of the material flows into the channels (58). The material that flows into the channels (58) flows up the channels (58) and eventually over the channels (58) into the distribution channel (52). All of the material from the distribution channel (52) exits orifice (86) of the middle nozzle (14) and then the orifice (98) of the outer nozzle (16).

As the second material exits the distribution channel (52) it encircles the inner stream of the first material exiting the orifice (36) of the inner nozzle (12), forming a two layer stream of material. As the outer layer or the first material exits the distribution channel (76), it encircles the two layer stream exiting the orifice (86) of the middle nozzle (14) to form a three layer stream. The three layer stream then enters the mold to form a three layer injection molded article.

Various circular seals are provided between the injection molding machine nozzle manifold (not shown) and the inner nozzle (12), as well as between the inner nozzle (12) and the middle nozzle (14) of the nozzle assembly (10) to receive circular seals to prevent leakage of materials from the nozzle assembly and to keep the different materials from mixing with each other. The seals must be made of a material that withstands high heat and pressure, is compressible and expandable. The seals can be made of materials selected from the group consisting of copper, polymers of fluorinated hydrocarbons such as one sold under the trademark Teflon®, glass filled Teflon®, and other synthetic resinous materials such as one sold under the trademark Vespel®.

The inner nozzle (12) has a seal groove (150) around the orifice (30) to receive a seal to prevent leaks of the second material from the injection molding machine manifold. The inner nozzle also has a seal groove (152) to receive a seal to keep the second material isolated from the first material. Seal groove (154) is provided around inlet (28) to receive a seal to prevent leaks of the first material from the injection molding machine nozzle manifold (not shown). Seal grooves (156) and (160) are provided around a lower end and an upper end of the cylindrical portion (22) of the inner nozzle (12), respectively, to receive seals to keep the second material isolated from the first material. Seal groove (158) is provided on the top surface (44) of the base portion (20) of the inner nozzle (12) to receive a seal to prevent the first material from leaking to the outside of the nozzle assembly (10).

As shown in FIG. 2, the inner nozzle (12) is interfit within the middle nozzle (14). The middle nozzle (14) is interfit with the outer nozzle (16). The lock nut (18) is interfit with the outer nozzle (16). The lock nut (18) has external threads (170) to secure the assembly (10) to the injection molding machine nozzle manifold. External threads (172) are also provided on the outer nozzle (16) so that an extraction tool can be threaded onto the nozzle assembly (10) and can be used to pull the assembly (10) off of the injection molding machine nozzle manifold.

For ease of assembly of the nozzles, various alignment holes and pins are provided on the nozzles. For example, the inner nozzle (12) has an alignment hole (200) to receive a pin on the injection machine manifold (not shown). The inner nozzle (12) also has an alignment holes (202). Holes (202) are aligned with alignment holes (205) in the outer nozzle (16). Pins are inserted into the aligned holes (202) and (205) to mount the outer nozzle (16) to the inner nozzle (12). The inner nozzle (12) also has an alignment hole (207) which is aligned with alignment hole (204) in the middle nozzle (14). Holes (207) and (204) also receive a pin (not shown) to mount the middle nozzle (14) to the inner nozzle (12).

The inner nozzle also has three assembly holes (220) therein which are aligned with three threaded assembly holes (222) in the outer nozzle (16). When aligned, the aligned holes (220) and (222) receive an assembly screw (not shown) which is inserted through the assembly holes (220) and threaded into the threaded assembly holes (222) to secure the outer nozzle (16) to the inner nozzle (12) and to keep the nozzle assembly (10) from becoming disassembled.

The inner nozzle also has a threaded bore (230) which is used in conjunction with a jack screw (not shown) to disassemble the nozzle assembly (10). The jack screw is threaded into the bore (230) from the bottom (26) of the inner nozzle (12) and pushes the outer nozzle (16) away from the inner nozzle (12). The middle nozzle (14) has similar threaded bores (232). Jack screws can be threaded into the bores (232) to push the inner nozzle (12) away from the middle nozzle (14).

From the foregoing description, it will be apparent that the multilayer injection nozzle assemblies of the present invention have a number of advantages, some of which have been described above and others of which are inherent in the multilayer injection nozzle assemblies of the present invention. Also, it will be understood that modifications can be made to the multilayer injection nozzle assemblies of the present invention without departing from the teachings of the invention. Accordingly the scope of the invention is only to be limited as necessitated by the accompanying claims.

I claim:

1. A multilayer injection nozzle assembly, for use with an injection molding machine, to form a multilayer injection molded article, said assembly comprising:

an inner nozzle, a middle nozzle and an outer nozzle;

said inner nozzle having a first hole therein which communicates with a first channel in said inner nozzle for receiving a flow of a first material from the injection molding machine, and having a second hole which communicates with a second channel in said inner nozzle for receiving a flow of a second material from the injection molding machine;

said first channel communicating with an inner and an outer channel in said inner nozzle, whereby the first material flows from said first channel into both said inner channel and said outer channel, and the first material that flows into said inner channel will flow out of the nozzle assembly to form a first layer of the injection molded article and the material that flows into said outer channel will flow out of the nozzle assembly to form a second layer of the injection molded article.

2. The nozzle assembly of claim 1 having a first flow path for the first material defined by said first channel in said inner nozzle and said inner channel in said inner nozzle.

3. The nozzle assembly of claim 2 having a second flow path for the first material defined by said first channel in said inner nozzle and said outer channel in said inner nozzle.

4. The nozzle assembly of claim 1 further including a inner distribution channel defined in an area between said inner nozzle and said middle nozzle, wherein the second material that flows into said inner nozzle flows out of said second channel in said inner nozzle and into said inner distribution channel between said inner nozzle and said outer nozzle, said second material flowing out of said inner distribution channel and out of said nozzle assembly to form a layer of an injection molded article.

5. The nozzle assembly of claim 1 further including an outer distribution channel defined in an area between said middle nozzle and said outer nozzle, and said middle nozzle having a channel therein, wherein said first material that flows into said outer channel in said inner nozzle flows out of said outer channel, through said channel in said middle nozzle and into said outer distribution channel, said first material flowing out of said outer distribution channel and out of said outer nozzle to form a layer of an injection molded article.

6. A multilayer injection molding nozzle assembly for use with an injection molding machine, said assembly comprising:

an inner nozzle, a middle nozzle and an outer nozzle, said inner nozzle having an inlet for receiving a stream of a first material and having a first and a second outlet for the first material;

means, within said inner nozzle, for splitting the stream of the first material into two streams of material wherein one of the split streams of material will exit the inner nozzle through said first outlet and the other of said split streams will exit the inner nozzle through said second outlet.

7. The nozzle assembly of claim 6 wherein said means for splitting said stream of said first material includes a passage in said inner nozzle that splits into an inner conduit and an outer conduit in said inner nozzle.

* * * * *